G. L. SQUIRE.
TRUCK.
APPLICATION FILED SEPT. 26, 1921.
1,424,528.
Patented Aug. 1, 1922.
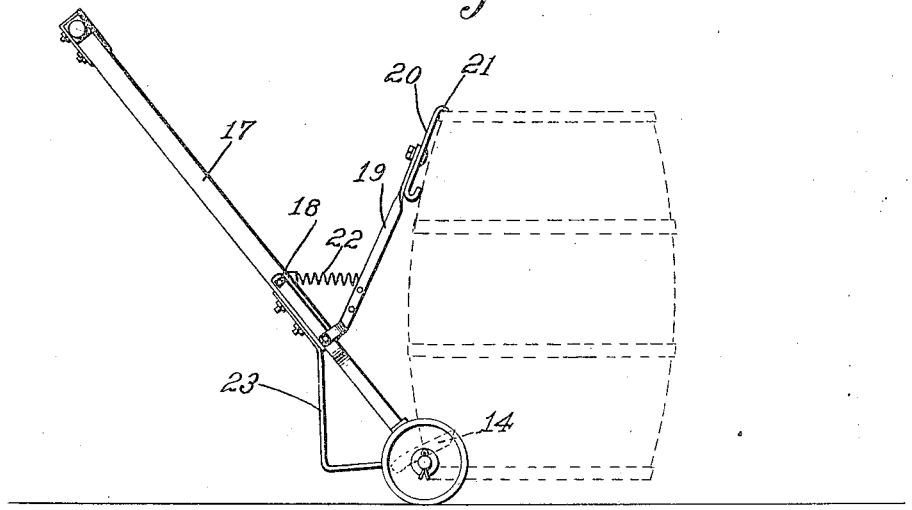
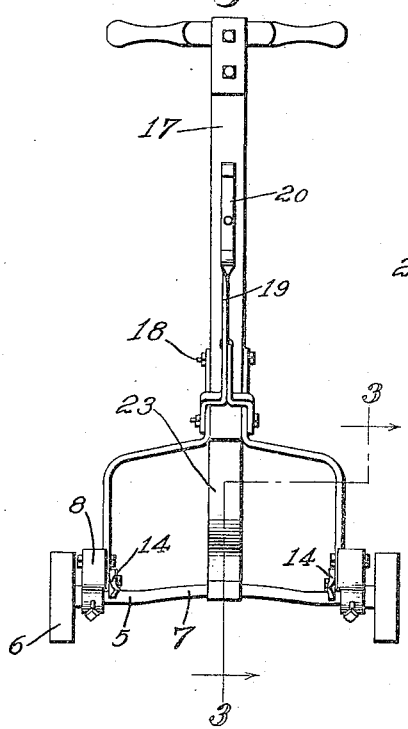
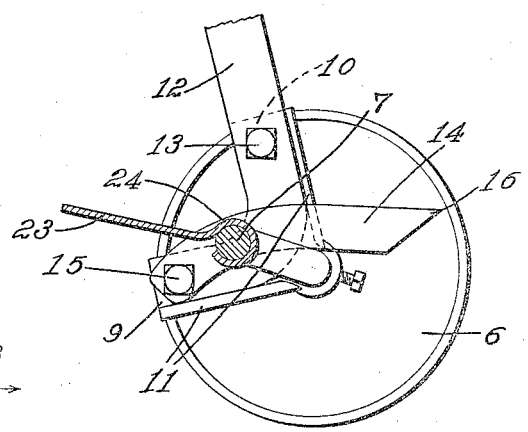
Inventor
G. L. Squire.
By
Attorney

UNITED STATES PATENT OFFICE.

GAYLE L. SQUIRE, OF HASTINGS, FLORIDA.

TRUCK.

1,424,528.	Specification of Letters Patent.	Patented Aug. 1, 1922.

Application filed September 26, 1921. Serial No. 503,225.

*To all whom it may concern:*

Be it known that I, GAYLE L. SQUIRE, a citizen of the United States, residing at Hastings, in the county of Saint Johns and State of Florida, have invented a new and useful Truck, of which the following is a specification.

This invention relates to two-wheeled hand trucks, the primary object of the invention being to provide a truck which will support a barrel or the like in a vertical position, while the truck is being moved.

Another object of the invention is to provide a truck having means to pierce the staves of a barrel, when the truck is in a vertical position, the piercing means being designed to raise the barrel from the surface on which the same is supported, when the truck is moved to an inclined or rolling position.

A still further object of the invention is to provide a truck constructed to shift the center of gravity of the load supported by the same, to a point to permit the movement of the truck and its load with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a truck constructed in accordance with the present invention and showing the same as supporting a barrel.

Figure 2 is a front elevational view of the same.

Figure 3 is a sectional view taken on line 3—3 of Figure 2.

Referring to the drawing in detail, the truck embodies a supporting axle 5 on the ends of which are mounted the wheels 6, which may be secured to the axle in any desirable and well known manner.

This supporting axle 5 is provided with a curved portion 7 disposed substantially intermediate the ends thereof, the curvature of the axle being such as to conform to the curvature of a barrel to permit the barrel to be supported to the rear of the horizontal plane of the hubs of the wheels 6.

Secured to the axle 5 at points adjacent to the ends thereof are the bracket members 8 which have portions embracing portions of the axle, means being provided to secure the brackets to the axle to move therewith. This bracket embodies right angled arms 9 and 10 respectively, the arms being provided with flanges 11 providing abutments for the frame 12 of the truck which is shown as bolted thereto as by means of the bolts 13.

Spikes indicated at 14 are secured to the brackets as by means of the bolts 15, the spikes being of constructions to overlie portions of the axle, the pointed extremities 16 thereof being curved slightly inwardly as clearly shown by Figure 2 of the drawings. The spikes are positioned to extend upwardly when the truck is in an inclined position, or in a position as shown by Figure 1 of the drawing, so that a barrel or article supported thereon will be pierced by the spikes, the weight of the barrel or article forcing the spikes into the barrel to insure against movement of the barrel with respect to the truck.

A handle 17 forms a part of the truck, and has connection with the frame 12 thereof, as by means of the bolts 18 which pass through registering openings in the side arms of the frame and the handle. Pivotally connected with the handle at a point adjacent to the frame of the truck, is a pivoted arm indicated at 19, which arm is provided with a pivoted bar 20 formed with hook members 21 at the respective ends thereof. The arm 20 is connected with the arm 19 to provide a section relatively long and a relatively short section, whereby barrels of various heights and dimensions may be grasped by the arm to hold the barrel to the truck.

A spring 22 is disposed between the handle 17 and arm 19 and is constructed to normally expand and force the arm 19 away from the handle 17 where the same may automatically grip the upper edge of a barrel. A rest 23 has connection with the handle 17, the lower end thereof having connection with the axle 7 as at 24, the rest acting as a support for the truck to hold the same in an upright position and at the same time provides a stop to be engaged by the foot of the operator, whereby the truck may be forced into engagement with the article to be lifted.

In the use of the truck, the truck is held in a vertical position and moved so that the spikes will embed themselves in the barrel or like article to be lifted. The hook member 21 is now positioned over the upper edge of the barrel, and the handle 17 moved rearwardly to a position as indicated by Figure 1 of the drawing.

It will thus be seen that the barrel is now raised to a position as shown by Figure 1 and the spikes embedded to support the barrel out of contact with the surface on which the same was supported to permit the truck to be moved.

Having thus described the invention, what is claimed as new is:—

1. A hand truck, comprising an axle, wheels supported by the axle, a frame supported by the axle, a handle having connection with the frame, spikes supported above the axle and adapted to engage an article carried by the truck, a pivoted arm supported by the frame and adapted to engage over the upper edge of an article supported by the truck, and means for normally urging the arm into engagement with the article supported by the truck.

2. In a hand truck, an axle having a curved portion, wheels supported on the axle, bracket members including arms supported by the axle, one of the arms of each bracket extending rearwardly from the axle, a spike having connection with each of the rearwardly extending arms and being of a length to engage the axle and extend beyond the forward portion thereof, and means for contacting with the upper edge of a barrel.

In testimony that I claim the foregoing as my own, I have hereto affixed my signature in the presence of a witness.

GAYLE L. SQUIRE.

Witness:
IVY E. SIMPSON.